United States Patent [19]

Eguchi

[11] Patent Number: 4,731,740
[45] Date of Patent: Mar. 15, 1988

[54] TRANSLATION LOOKASIDE BUFFER CONTROL SYSTEM IN COMPUTER OR VIRTUAL MEMORY CONTROL SCHEME

[75] Inventor: Kazutoshi Eguchi, Tokyo, Japan

[73] Assignee: Kabushiki Kaisha Toshiba, Kawasaki, Japan

[21] Appl. No.: 749,866

[22] Filed: Jun. 28, 1985

[30] Foreign Application Priority Data

Jun. 30, 1984 [JP] Japan ............................ 59-135906
Jun. 30, 1984 [JP] Japan ............................ 59-135907

[51] Int. Cl.⁴ ............................................ G06F 12/08
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,145,738 | 3/1979 | Inoue et al. | 364/200 |
| 4,376,297 | 3/1983 | Anderson et al. | 364/200 |
| 4,604,688 | 8/1986 | Tone | 364/200 |
| 4,638,426 | 1/1987 | Chang et al. | 364/200 |

*Primary Examiner*—Raulfe B. Zache
*Attorney, Agent, or Firm*—Finnegan, Henderson, Farabow, Garrett & Dunner

[57] ABSTRACT

In a TLB control system of the invention, each TLB entry has a bit V' representing validity of the entry, a bit $VN_i (i=1, \ldots, n;$ n is an integer of 1 or more) representing the validity of TLB entry corresponding to the next page, and address translation data. A first detecting means detects, for each memory access, if correct address translation data is stored in the entry, and if correct address translation data is stored in the TLB entry corresponding to the next page, in accordance with an object virtual address and predetermined fields of the bits V' and $VN_i$, and the address translation data corresponding to the object virtual address. A second detecting means detects if a single memory access involves a page boundary. A replacing means replaces a corresponding entry of the TLB in accordance with detection results of the first and second detecting means. When the TLB entry is replaced by the replacing means, the bit V' of a replace object TLB entry is set unconditionally. The bit $VN_i$ of the TLB entry corresponding to a page immediately preceding the page indicated by the replace object TLB entry, is updated. The TLB entry corresponding to a page immediately succeeding the page indicated by the replace object TLB entry, is checked, and the bit $VN_i$ of the replace object TLB, is set in accordance with the checking result.

6 Claims, 10 Drawing Figures

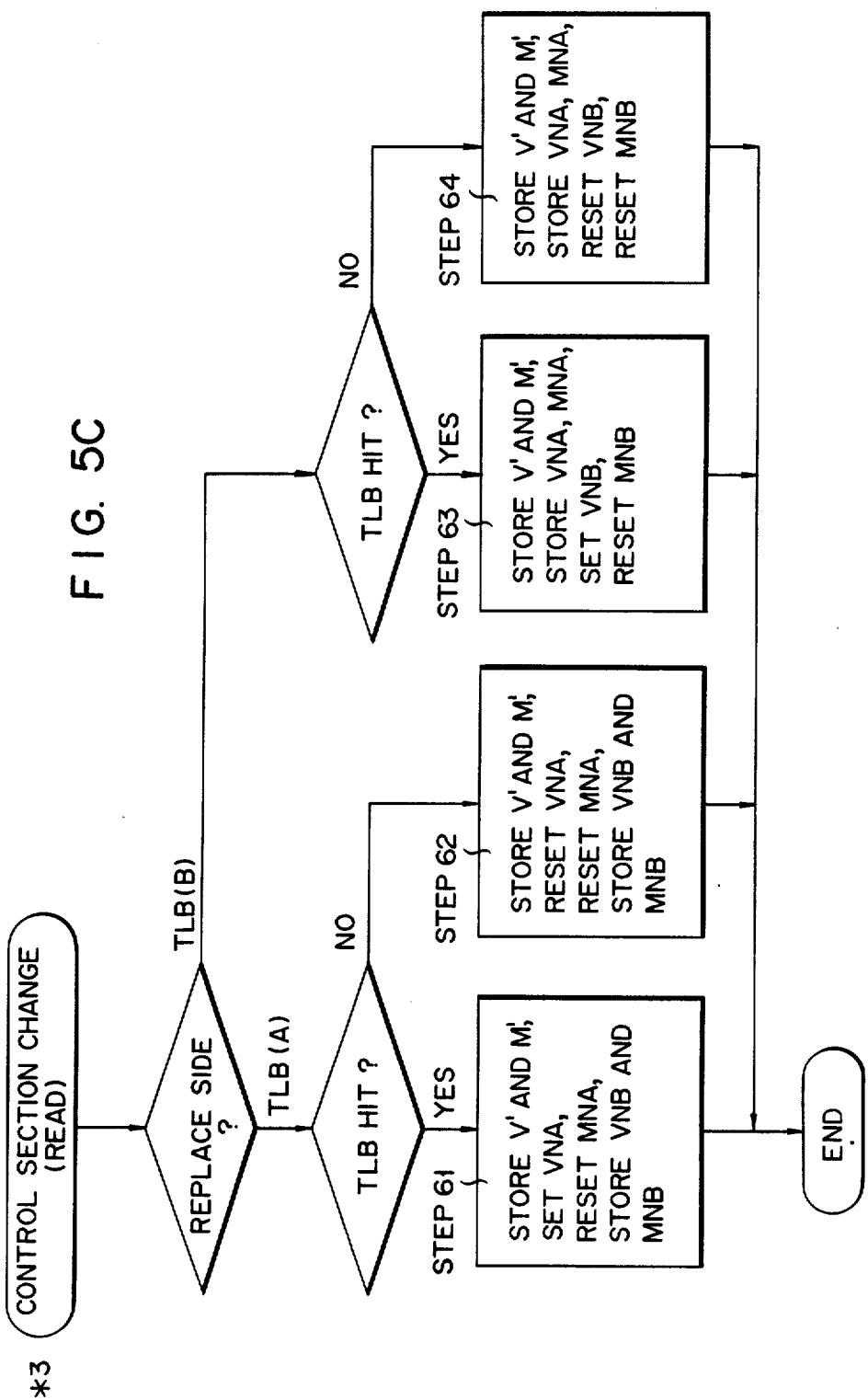

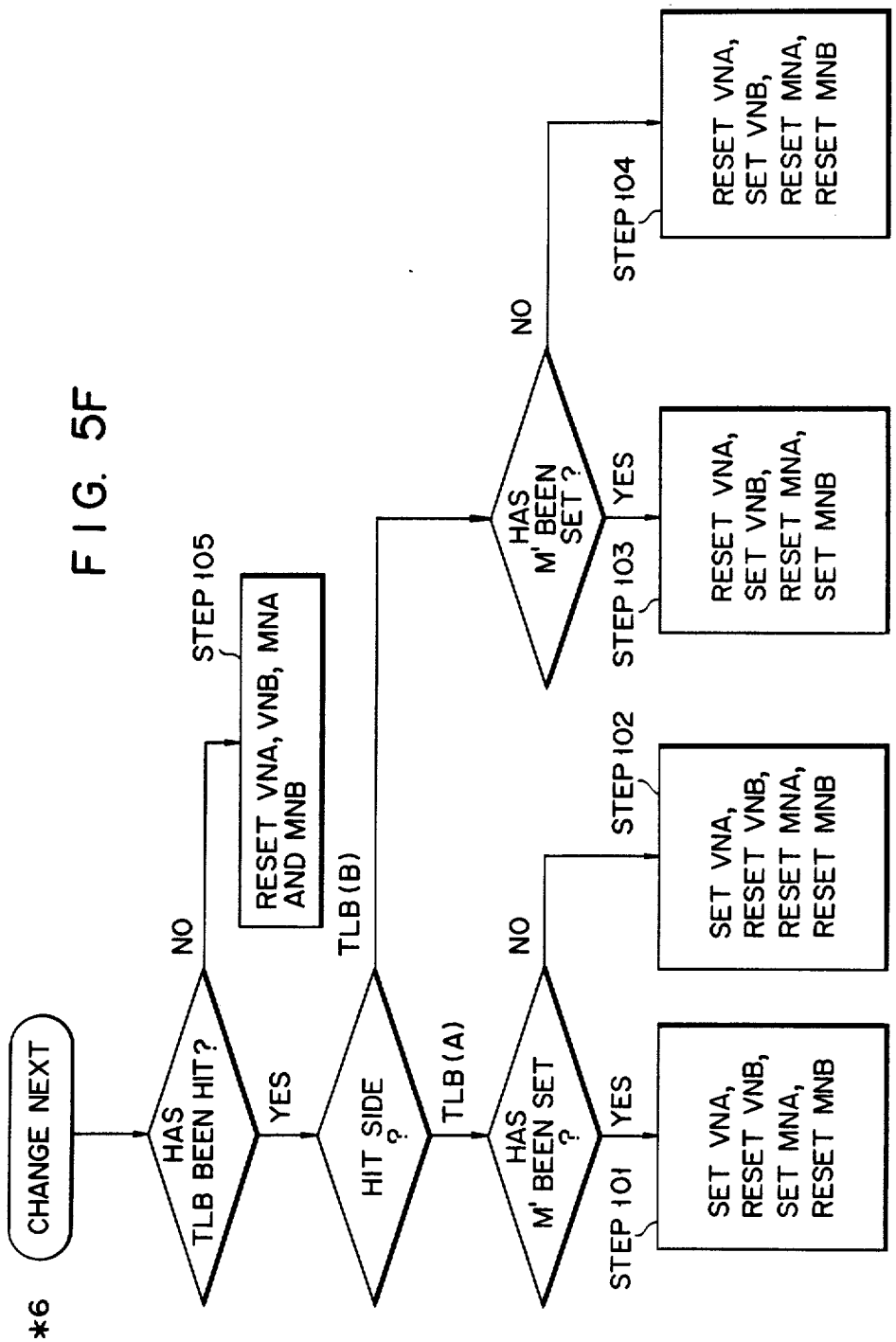

TRANSLATION LOOKASIDE BUFFER CONTROL SYSTEM IN COMPUTER OR VIRTUAL MEMORY CONTROL SCHEME

BACKGROUND OF THE INVENTION

The present invention relates to a TLB control system in a computer of virtual memory control scheme having a translation lookaside buffer (TLB).

In a computer of virtual memory control scheme, an address translation buffer called a TLB is used to perform high-speed address translation of virtual addresses into real addresses. Each TLB entry has a field of address translation data, including a real page number and a valid bit field indicating validity (or invalidity) of the entry.

When a memory access is performed, the TLB is referred to using a predetermined field of the virtual address as an address. Validity of memory access is checked in accordance with the contents of the predetermined field of the virtual address and the corresponding TLB entry. When the memory access is determined to be valid, it is performed using the real address obtained by the real page number of the corresponding entry and the offset data of the virtual address. Conversely, when the memory access is determined to be invalid, TLB entry replace is performed, and, thereafter, the memory access is performed.

In a computer of virtual memory control scheme using the TLB as described above, processing speed is slow in the case of a fullword access of a halfword boundary, involving a page boundary. When a memory access involves a boundary between two pages, the TLB entries corresponding to the two pages must be checked to determine validity of the memory access, all of which delays processing.

SUMMARY OF THE INVENTION

It is an object of the present invention to provide a TLB control system which can determine validity of a memory access, involving a page boundary, by checking the TLB entry corresponding to only the first page, thereby improving the processing speed.

It is another object of the present invention to provide a TLB control system which can easily determine, even in the case of a memory access involving a page boundary, the state of a modify bit which is prepared in a page table entry and represents if the corresponding page has been rewritten.

It is still another object of the present invention to provide a TLB control system which can easily determine the modify bit state and which can, at the same time, reduce the replace frequency of TLB entries.

In order to achieve the above object of the present invention, there is provided a translation lookaside buffer (TLB) control system in a computer of virtual memory control scheme, comprising:

a translation lookaside buffer including, in each TLB entry, fields of a bit V' representing validity of the entry, a bit $VN_i$ ($i=1, \ldots, n$; n is an integer of 1 or more) representing validity of a TLB entry corresponding to a page next to the page of the entry, and address translation data;

first detecting means for detecting, for each memory access, if correct address translation data is stored in the entry as well as if correct address translation data is detected in the TLB entry corresponding to the page next to the page of the entry in accordance with an object virtual address and predetermined fields of the bits V' and $VN_i$, and the address translation data of the TLB entry which corresponds to the object virtual address;

second detecting means for detecting if a single access involves a page boundary;

replacing means for performing a replace of the entry of the TLB in accordance with detection results of the first and second detecting means; and updating means for updating a bit $VN_i$ of a TLB entry corresponding to a page immediately preceding the TLB entry to be replaced when the TLB entry is replaced by the replacing means.

The system, according to the present invention, has the following effects and advantages:

(i) Each entry of the TLB correctly sets updated control information for not only the corresponding page, but also for the next page. Therefore, even in the case of a memory access involving a page boundary, the TLB entry of the first page, before the page boundary in question, need only be checked to determine validity of the memory access, thereby allowing high-speed processing.

(ii) In a system wherein a modify bit representing if the corresponding page has been rewritten, is adopted, even in the case of a memory access involving a page boundary, the state of the modify bit can be determined easily, and the setting frequency of the modify bit of the page table entry can be reduced.

(iii) In a system wherein the modify bit of the page table entry can be easily determined, when a memory write access is made to the page which has been previously read-accessed, replace of the corresponding TLB entry need not be performed.

BRIEF DESCRIPTION OF THE DRAWINGS

Other objects and features of the present invention will be apparent from the following description taken in connection with the accompanying drawings in which:

FIGS. 2, 3, 4, 5A, 5B, 5C, 5D, 5E, and 5F are flow charts showing the operation sequence of a control circuit 37 in FIG. 1, in which FIG. 2 is a flow chart showing the TLB replace sequence when a TLB mishit occurs in memory read operation, FIG. 3 is a flow chart showing the TLB replace sequence when a TLB mishit occurs in memory write operation, FIG. 4 is a flow chart showing the TLB modify bit set sequence in memory write operation, FIG. 5A is a flow chart showing the detailed operation sequence of a TLB replace (read) command in the flow chart shown in FIG. 2, FIG. 5B is a flow chart showing the detailed operation sequence of a TLB replace (write) command in the flow chart shown in FIG. 3, FIG. 5C is a flow chart showing the detailed operation sequence of a control section change (read) command in the flow chart shown in FIG. 2, FIG. 5D is a flow chart showing the detailed operation sequence of a control section change (write) command in the flow chart shown in FIG. 3, FIG. 5E is a flow chart showing the detailed operation sequence of a check command shown in FIGS. 2 and 3, and FIG. 5F is a flow chart showing the detailed operation sequence of a change next command shown in FIGS. 2 and 3.

DETAILED DESCRIPTION OF THE PREFERRED EMBODIMENT

Figure 1:
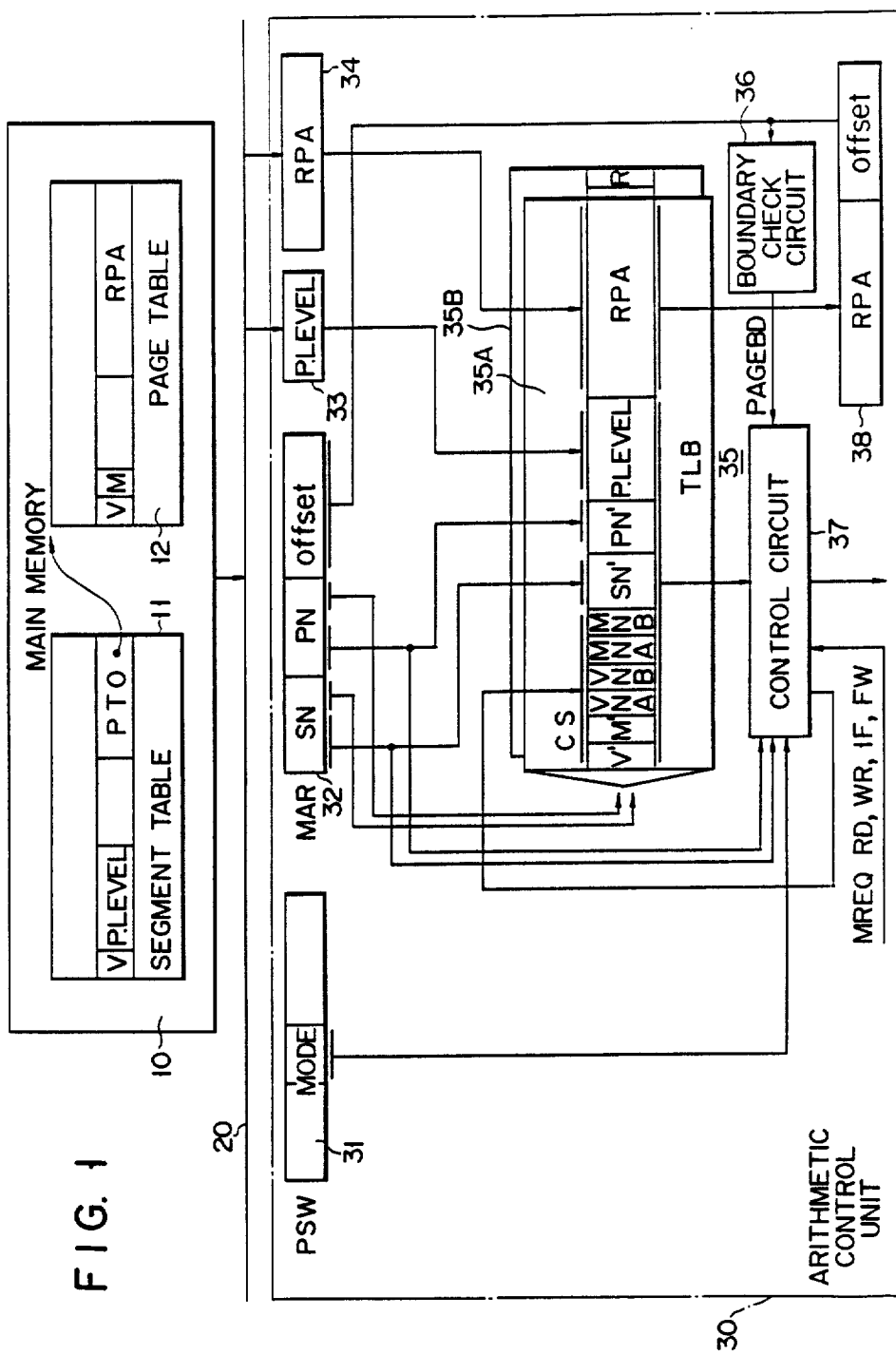
FIG. 1 is a block diagram showing the configuration of a TLB control system of virtual memory control scheme according to an embodiment of the present invention.

Referring to FIG. 1, a main memory 10 stores a segment table 11 representing segment data of a virtual address space, and a page table 12 representing page data in each segment. Each entry in the segment table 11 has fields of a valid bit V representing validity of the entry, main storage protection data P.LEVEL of the segment, and a page table start address PTO as the corresponding start address of the page table 12. Each entry of the page table 12 has fields of a valid bit V representing validity of the entry, a modify bit M indicating that the corresponding page has been rewritten, i.e., indicating that the content of the corresponding page in the virtual space must be updated to the content of the corresponding page in the main memory 10, and a real address RPA for translating a virtual address into a real address. An arithmetic control unit 30 is connected to the memory 10 through a data bus 20.

A program status word (PSW) register 31 in the arithmetic control unit 30 stores mode data MODE representing the program run mode (protection priority level). A memory address register (MAR) 32 stores a virtual address. The virtual address is logically divided into segment number SN, page number PN, and page offset OFFSET. A protection register 33 temporarily stores main storage protection data P.LEVEL stored in the entry of the segment table 11. An RPA register 34 temporarily stores a real page number RPA stored in the entry of the page table 12. A TLB 35 performs high speed translation of a virtual address into a real address. The TLB 35 consists of two TLBs 35A and 35B and is accessed by linked data of part, e.g., the lower bit of the segment number SN of the virtual address held in the MAR 32 with part, e.g., the lower bit of the page number PN. The part of the segment number SN constitutes the lower bit in the linked data. Each entry of the TLBs 35A and 35B has fields of control section CS, bits SN' and PN', address translation data including RPA, and data P.LEVEL. The control section CS consists of bits V', M', VNA, VNB, MNA and MNB. The bit V' represents validity of the corresponding entry. The bits VNA and VNB represent validity of the entries of the TLBs 35A and 35B which correspond to the page next to the page of the current entry. The bit M' represents the state of the modify bit M of the entry in the page table 12 which corresponds to the current page. The bits MNA and MNB represent the state of the modify bit M in the page table 12 which corresponds to the page next to the current page. The field SN' corresponds to the remaining bit (upper bit) of the segment number SN, and the field PN' corresponds to the remaining bit of the page number PN. Each entry of the TLB 35B also has a reference bit R. The bit R represents which of the TLBs 35A and 35B has been least recently referred to.

A boundary check circuit 36 checks if a memory access involves a page boundary in accordance with the page offset OFFSET of the virtual address held in the MAR 32, and produces a signal PAGEBD representing the checking result. A control circuit 37 controls the TLB 35 and the like. A register 38 holds a real address. The control circuit 37 receives the retrieval result from the TLB 35, i.e., the control section CS, bits SN' and PN' and data P.LEVEL; the upper bits of the segment number SN and the page number PN of the virtual address held in the MAR 32, the signal PAGEBD from the page boundary circuit 36, and various memory control signals from a microprogram control section (not shown). The memory control signals include a signal MREQ requesting a memory access, a signal RD representing a memory read, a signal WR representing a memory write, a signal IF presenting an instruction fetch, and a signal FW representing a fullword access.

The mode of operation of the embodiment of the present invention will now be described. Assume that a virtual address is loaded in the MAR 32 in order to make a memory access to the main memory 10. The page offset OFFSET in the virtual address loaded in the MAR 32 is supplied to the boundary check circuit 36. When the memory access to the main memory is a fullword access, the circuit 36 checks if the memory access involves a page boundary. In this embodiment, 1 page consists of 2 k bytes and the number of bits of the offset OFFSET is 11. In this case, if a condition is a fullword access of a halfword boundary, the boundary check circuit 36 needs to check if the offset OFFSET is "7FE" (hexadecimal notation). The circuit 36 supplies to the control circuit 37, a signal PAGEBD representing the result of checking based on the offset OFFSET from the MAR 32.

Meanwhile, linked data of the lower bits of the segment number SN and the page number PN of the virtual address loaded in the MAR 32, is supplied to the TLB 35. Then, the storage data is read out from the entries of the TLBs 35A and 35B corresponding to the linked data. Of the data read out from the TLB 35, V', M', VNA, VNB, MNA, MNB, SN', PN', P.LEVEL and R (R is read out only from the TLB 35B) are supplied to the control circuit 37. The upper bit (SN') of the segment number SN of the virtual address loaded in the MAR 32, the upper bit (PN') of the page number PN thereof, and MODE from the PSW 31 are also supplied to the MAR 32. In response to these input signals, the control circuit 37 generates signals MISS, PRT, MOD, NEXT:MISS, and NEXT:MOD. The signal MISS represents that the corresponding entry of the TLB 35 does not have correct address translation data for translating the virtual address into a real address; the signal MISS represents a TLB mishit. The signal PRT represents that the operation mode indicated in the PSW 31 does not have a memory access right to the corresponding segment (The signal PRT represents an illegal operation against main storage protection.) The signal MOD represents that the modify bit M of the corresponding entry of the page memory 12 is not set, a state called "modify". The signal NEXT:MISS represents that the TLB entry corresponding to the page next to the page to be accessed is not correctly created, indicating a next page mishit. The signal NEXT:MOD represents that the modify bit M of the page table entry corresponding to the page next to the page to be accessed is not set, indicating a next page modify. The creation logics of these signals are as follows.

$$MISS \quad \text{I.}$$
$$MISS = \overline{HIT}$$
$$HIT = HIT_A + HIT_B$$
$$HIT_i = V_i \cdot (SN' = TLB_i(SN')) \cdot (PN' = TLB_i(PN'))$$

where SN' and PN' represent the upper bits of the numbers SN and PN from the MAR 32, and $V_i$, $TLB_i(SN')$ and $TLB_i(PN')$ represent V, SN' and PN' of the corresponding entry of the TLB $35_i$ (i=A, B). Therefore, $HIT_i$ (i=A, B) indicates that correct address translation data is present in the corresponding entry of the TLB 35$_i$. The HIT represents if correct address translation data is set in the TLB 35A or 35B, indicating a TLB hit.

PRT    II.

$PRT = HIT_A \cdot (MODE \geq P \cdot LEVEL_A) +$ $HIT_B \cdot (MODE \geq P \cdot LEVEL_B)$ where P.LEVEL$_i$ (i=A, B) indicates the data P.LEVEL of the corresponding entry of the TLB 35$_i$.

MOD    III.

$MOD = HIT_A \cdot \overline{MA} + HIT_B \cdot \overline{MB}$ where M$_i$ (i=A, B) indicates the modify bit M of the corresponding entry of the TLB 35$_i$.

NEXT:MISS    IV.

$NEXT:MISS = HIT_A \cdot (\overline{VNA_A + VNB_A}) +$ $HIT_B \cdot (\overline{VNA_B + VNB_B})$ where VNA$_i$ and VNB$_i$ (i=A, B) indicate the bits VNA and VNB of the corresponding entry of the TLB 35$_i$.

NEXT:MOD    V.

$NEXT:MOD = HIT_A \cdot (\overline{MNA_A + MNB_A}) +$ $HIT_B \cdot (\overline{MNA_B + MNB_B})$ where MNA$_i$ and MNB$_i$ (i=A, B) indicate the bits MNA and MNB of the corresponding entry of the TLB 35$_i$.

The signals in items I through V above, are supplied from the control circuit 37 to a microprogram control section (not shown), and are used to check validity of a memory access by the microprogram before the memory access is made.

In this embodiment, validity check of a memory access is also performed in the control circuit 37. The reason being that if the microprocessor is used to check a memory access in the case where the memory access is performed only once, e.g., in the case of a LOAD instruction, the processing speed is considerably decreased. In other words, the control circuit 37 checks the signals I through V, i.e., the validity from the microprogram control section by means of hardware. When the validity of the memory access cannot be guaranteed, the control circuit 37 requests an interrupt in the firmware level before executing the instruction. In this case, a mishit interrupt signal MISS:INT, an illegal main storage protection interrupt signal PRT:INT, a modify interrupt signal MOD:INT, a next page mishit interrupt signal NEXT:MISS:INT, and a next page modify interrupt signal NEXT:MOD:INT in accordance with the following logic:

MISS:INT    VI.

$MISS:INT = MISS:MREQ$

PRT:INT    VII.

-continued $PRT:INT = \overline{MISS} \cdot PRT \cdot MREQ$

MOD:INT    VIII.

$MOD:INT = \overline{MISS} \cdot \overline{PRT} \cdot MOD \cdot MREQ \cdot WR$

NEXT:MISS:INT    IX.

$NEXT:MISS:INT = \overline{MISS} \cdot \overline{PRT} \cdot (\overline{MOD \cdot WR}) \cdot$ $NEXT:MISS \cdot NEXT:MREQ$ $NEXT:MREQ = MREQ \cdot PAGEBD \cdot FW$

NEXT:MOD:INT    X.

$NEXT:MOD:INT = \overline{MISS} \cdot \overline{PRT} \cdot \overline{MOD} \cdot \overline{NEXT:MISS} \cdot$ $NEXT:MOD \cdot NEXT:MREQ \cdot WR$ As can be seen from the above logic, the interrupt signals VI to X have the interrupt priority. In the above case, the mishit interrupt (VI) has the highest priority, the signals VII and VIII have next highest priority, and the signal X (next page modify) has the lowest priority.

When a mishit is detected in accordance with the above logic, the control circuit 37 replaces the corresponding entry in the TLB 35 under the control of the microprogram control section, as will be described later. In the case of an illegal operation against main storage protection, an interrupt signal is generated at the software level. In the case of a modify (interrupt), as will be described, the modify bit M of the corresponding entry of the page table 12 is set, as are the corresponding entries of the TLBs 35A and 35B. In the case of a next page mishit, as in the case of a mishit, the corresponding entries of the TLBs 35A and 35B are replaced in accordance with the operation sequence shown in FIGS. 2 and 3. In the case of a next page modify, as in the case of the operation sequence in a modify (interrupt) shown in FIG. 4, the modify bit M of the corresponding entry of the page table 12 is set, and the contents of the TLB 35 are updated. The next page mishit and the next page modify can be generated in the case of a fullword access involving a page boundary.

Replace of the entries of the TLBs 35A and 35B, and updating of the contents of the TLBs 35A and 35B will be described below. In the following description, the virtual address loaded in the MAR 32 is called an object virtual address, and an entry of the TLB 35, corresponding to the object virtual address, is called a TLB corresponding entry. A TLB entry set corresponding to a page immediately preceding the object virtual address, is called a TLB previous entry set, and a TLB entry set corresponding to a page immediately after the object virtual address, is called a TLB succeeding entry set.

Figure 2:
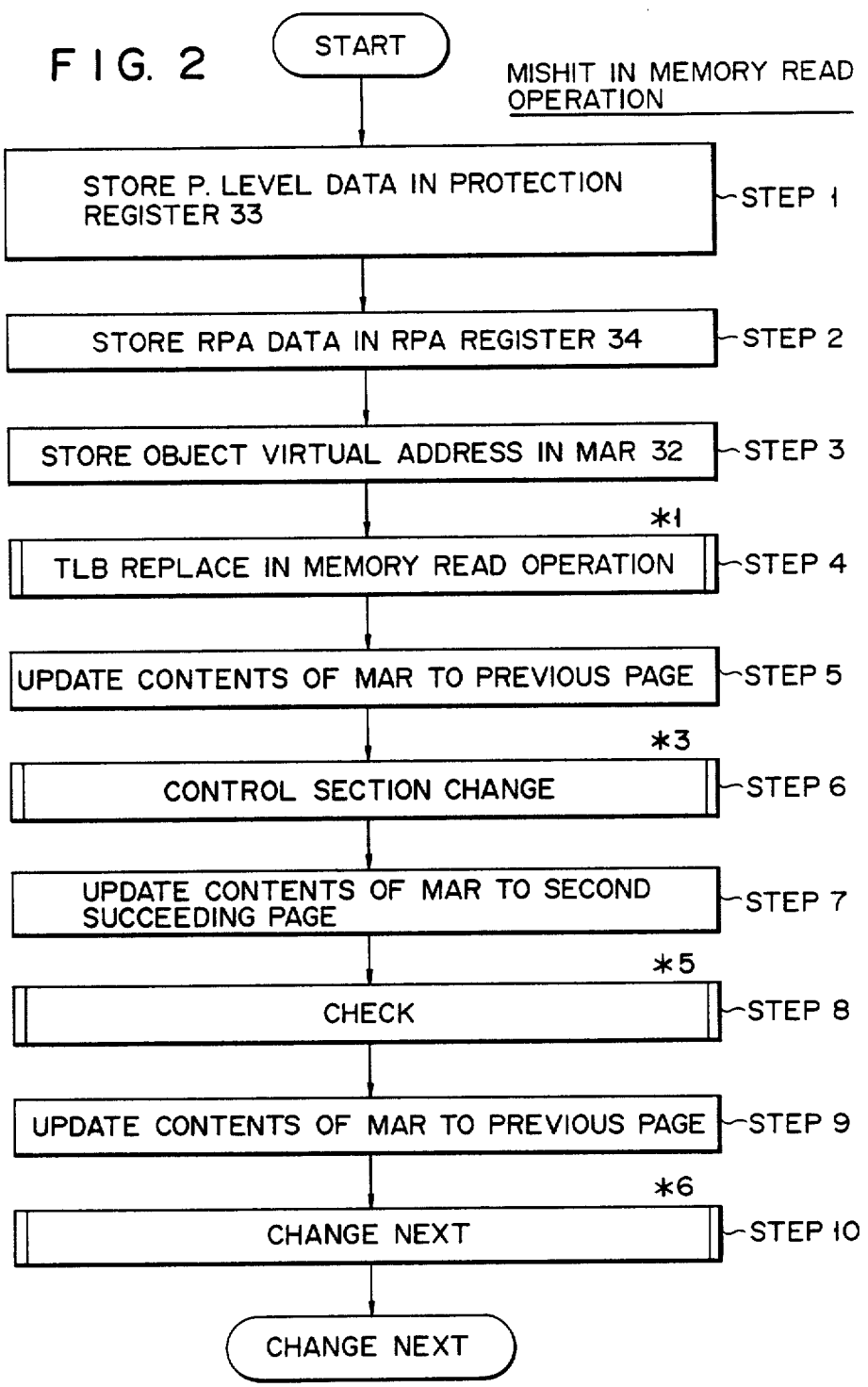

(1) Mishit in memory read operation (FIG. 2)

When a mishit interrupt is requested in a memory read operation, the main storage protection data P.LEVEL in the corresponding entry of the segment table 11 is loaded (STEP 1) in the protection register 33 under the control of the microprogram control section. The real page number RPA in the corresponding entry of the page table 12 is loaded in the RPA register 34 (STEP 2). The data P.LEVEL is obtained by accessing the segment table 11 in accordance with the segment start address stored in the segment table start register (not shown) and with the segment number SN of the virtual address. At this time, the page table start address is also obtained. The real page address RPA is obtained by accessing the page table 12 in accordance with the page table start address and the page number PN of the virtual address. The object virtual address is then stored in the MAR 32 (STEP 3).

When the data P.LEVEL and RPA are stored in this manner, a TLB replace command (read) is generated by the microprogram (STEP 4). In response to this command, among the entries of the TLBs 35A and 35B, the least recently referred entry, e.g., an entry of the TLB 35A is rewritten.

Figure 5A:
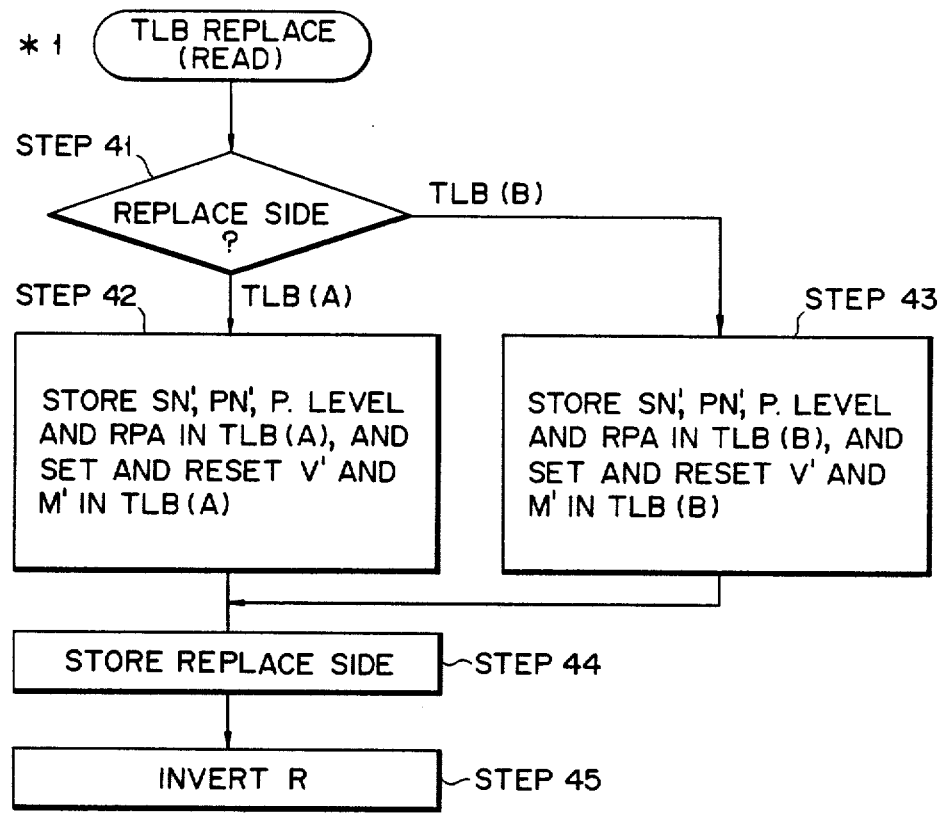
Figure 5B:
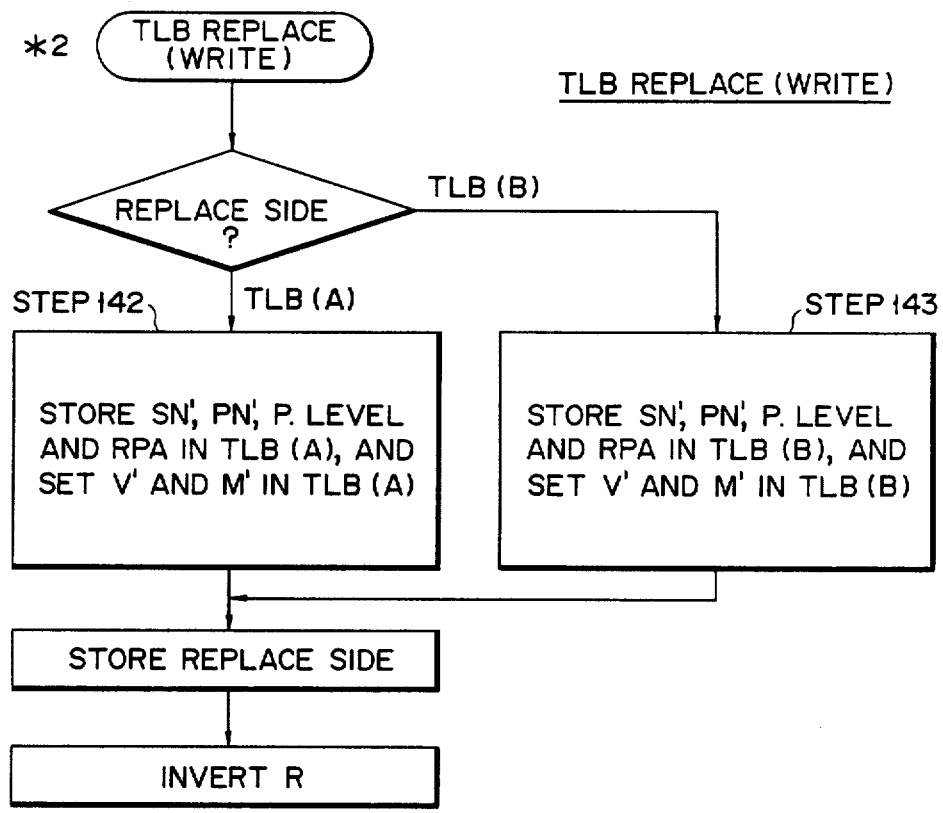
Figure 5D:
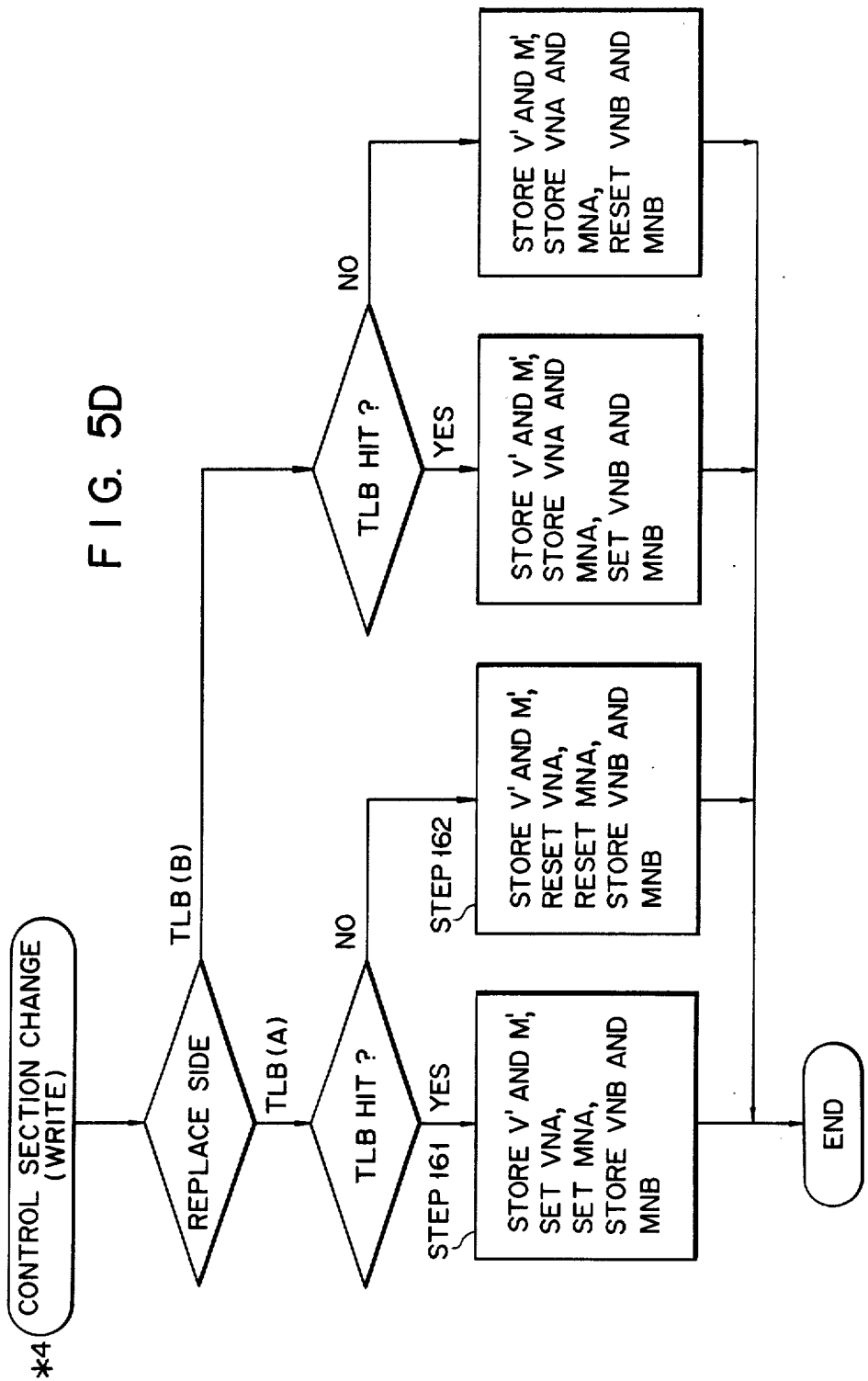

The operation sequence when a TLB replace (read) command is generated, is shown in FIG. 5A. Which one of the TLBs 35A and 35B is to be rewritten or replaced is determined in accordance with the reference bit R in the corresponding entry of the TLB 35B (STEP 41). In this replace operation, the bits SN' and PN' of the object virtual address, the data P.LEVEL from the protection register 33, and the address RPA from the RPA register 34 are written in predetermined fields of the TLB corresponding entry. The bit V' and the bit M' of the corresponding entry are set and reset, respectively, and the bits VNA, VNB, MNA, and MNB are kept unchanged (STEP 42 or 43). The TLB subjected to entry replace (A in this case) is stored (STEP 44). The logical value of the reference bit R is inverted (STEP 45).

After replace operation, the contents of the MAR 32 are changed to correspond to a page immediately preceding the object virtual address (STEP 5), and a control section change (read) command is generated (STEP 6). In response to this command, the control section CS of the TLB previous entry set is updated as shown in FIG. 5C. The updating content of the control section CS varies in accordance with whether the current case is a TLB hit in which the TLB previous entry set has correct address translation data corresponding to the virtual address set in the MAR 32 (virtual address corresponding to a page preceding the object virtual address), or a TLB miss in which the TLB previous entry set does not have such correct address translation data. The following description is made with reference to a case wherein an entry of the TLB 35A is replaced in response to a TLB replace (read) command.

| (a) TLB hit (STEP 61) | |
|---|---|
| V: not changed | VNA: set V', M': stored |
| VNB: not changed | (reset) |
| M: not changed | MNA: reset |
| MNB: not changed | (reset) VNB, MNB: stored |
| (b) TLB miss (STEP 62) | |
| V: not changed | VNA: reset V', M': stored |
| VNB: not changed | |
| M: not changed | MNA: reset |
| MNB: not changed | VNB, MNB: stored |

Similarly, when an entry in the TLB 35B is replaced, STEP 63 or 64 is executed.

Figure 5E:
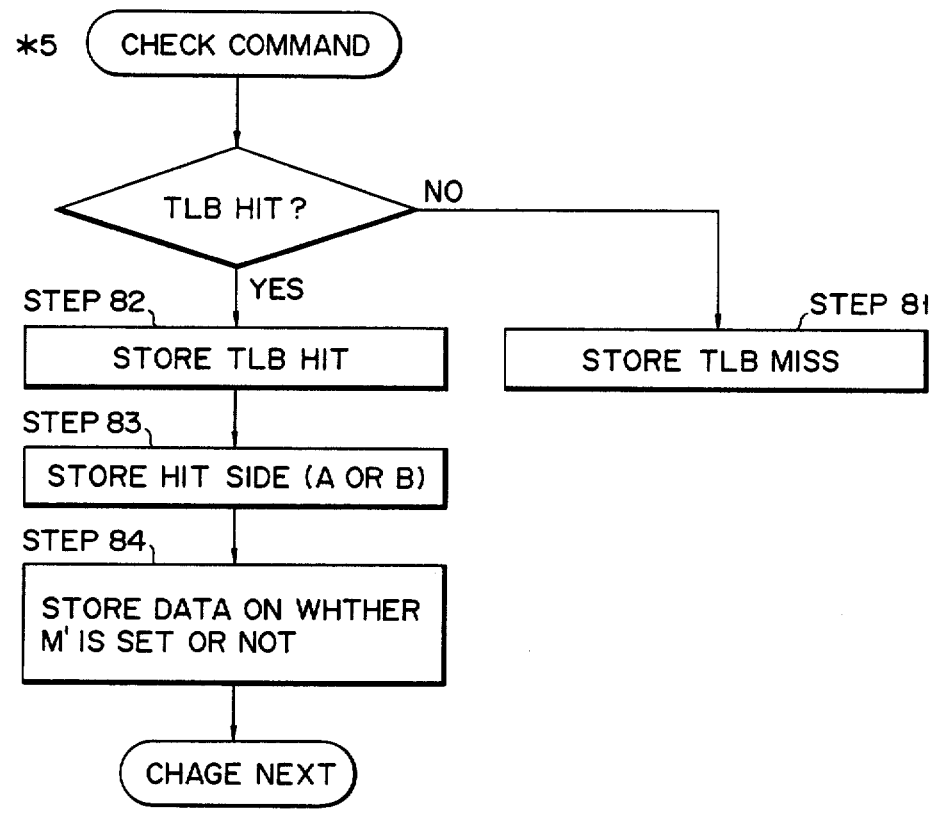

When updating of the control section CS of the TLB previous entry set is completed, the content of the MAR 32 is changed to indicate a page immediately after the object virtual address (STEP 7), and a check command is generated (STEP 8). In response to this command, the TLB succeeding entry set is checked. In particular, as shown in FIG. 5E, it is checked if the case is a TLB hit or a TLB miss and if the bit M is set. In the case of a TLB miss, the TLB miss is stored, and checking of the bit M becomes non-significant (STEP 81). When a TLB hit is detected upon this checking, after the TLB hit is stored (STEP 82), the hit TLB number (TLB 35A or 35B) is stored (STEP 8). The set/reset state of the bit M is also stored (STEP 84).

When checking of the TLB succeeding entry set is completed, the content of the MAR 32 is changed to correspond to a previous page to return to the object virtual address (STEP 9), and a change next command is generated (STEP 10). In response to this command, the bits VNA, VNB, MNA and MNB, kept unchanged upon replacing the TLB corresponding entry, are set at correct values as shown in FIG. 5F. At this time, data obtained by execution of the check command is utilized. Thus,

| (a-1) Bit M' is reset (STEP 104) | |
|---|---|
| VNA: reset | VNB: set |
| MNA: reset | MNB: reset |
| (a-2) Bit M' is set (STEP 103) | |
| VNA: reset | VNB: set |
| MNA: reset | MNB: set |

When a TLB hit (A side) is detected in response to a check command, STEP 101 or 102 is executed.

| (b) TLB miss detection by check command (STEP 105) | |
|---|---|
| VNA: reset | VNB: reset |
| MNA: reset | MNB: reset |

Figure 3:
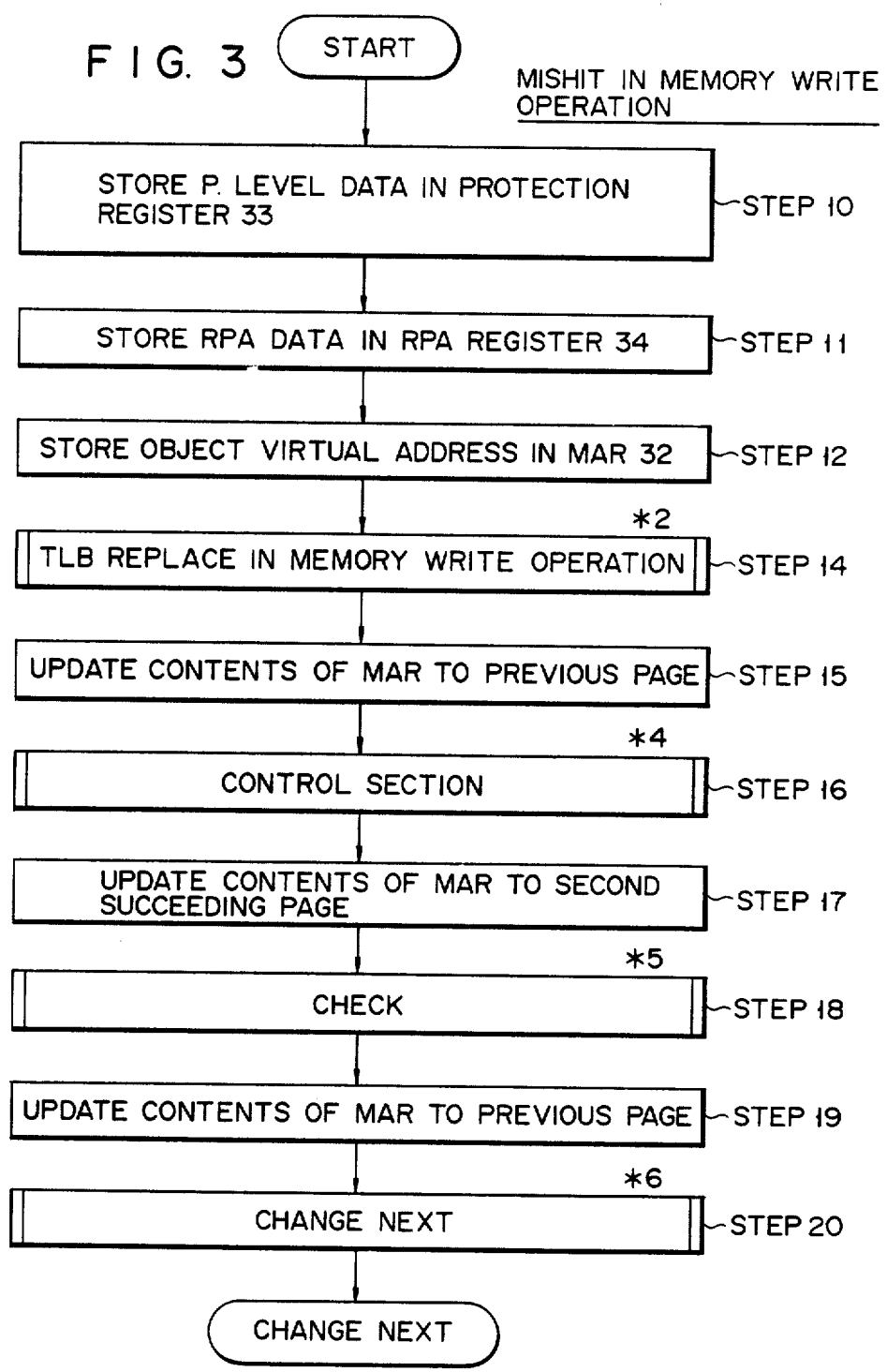

(2) Mishit in memory write operation (FIG. 3)

The TLB control sequence in the case of a mishit (interrupt) in the memory write operation is the same as that in the memory read operation, except that a TLB replace (write) command (STEP 14) is used in place of the TLB replace (read) command in item (1) above, a control section change (write) command is used in place of the control section change (read) command (STEP 16), and the modify bit M' of the corresponding entry of the page table 12 is set (STEP 142 or 143). In this case, the control sections CS of the corresponding entry and the TLB previous entry set are as follows:

| (a) TLB corresponding entry (STEP 142 or 143) | |
|---|---|
| V: set | VNA:* |
| VNB:* | |
| M: set | MNA:* |
| MNB:* | |

*indicates the same setting as in the case of the memory read operation.

| (b) TLB previous entry set | | |
|---|---|---|
| When the A side is replaced: | | |
| (b-1) TLB hit (STEP 161) | | |
| V: not changed | VNA: set | V', M': stored |
| VNB: not changed | (reset) | |
| M: not changed | MNA: set | |
| MNB: not changed | (reset) | VNB, MNB: stored |
| (b-2) TLB miss (STEP 162) | | |
| V: not changed | VNA: reset | |
| VNB: not changed | V', M': stored | |
| M: not changed | MNA: reset | |
| MNB: not changed | VNB, MNB: stored | |

Figure 4:
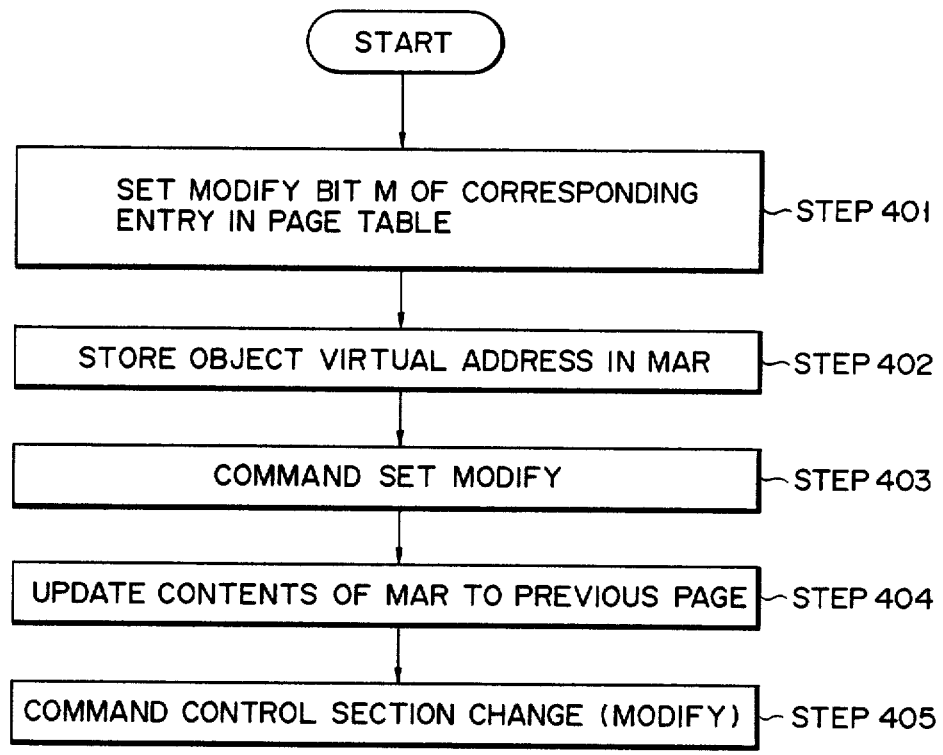

(3) Modify interrupt in memory write operation (FIG. 4)

When a modify interrupt is requested in the memory write operation, the modify bit M of the corresponding entry of the page table 12 is set (STEP 401). Then, the object virtual address is set in the MAR 32 (STEP 402), and the set modify command is generated (STEP 403). In response to this command, the bit M of the TLB corresponding entry (in this case, the TLB 35A) is set. The content of the MAR 32 is changed to indicate a page immediately preceding the object virtual address (STEP 404), and the control section change (modify) command is generated (STEP 405). In response to this command, the control section CS of the TLB previous entry set is updated. The updated content of the control section CS is different in accordance with if the TLB previous entry set has correct address translation data which corresponds to the virtual address indicating a page immediately preceding the virtual address (object virtual address) set in the MAR 32, i.e., a TLB hit, or if it does not have such correct address translation data, i.e., a TLB miss. The following exemplifies a case wherein the bit M of the corresponding entry of the TLB 35A is set by a set modify command.

| (a) TLB hit | |
| --- | --- |
| V: not changed | VNA: not changed (set) |
| VNB: not changed | |
| M: not changed | MNA: set |
| MNB: not changed | |
| (b) TLB miss | |
| V: not changed | VNA: not changed (reset) |
| VNB: not changed | |
| M: not changed | MNA: not changed (reset) |
| MNB: not changed | |

In this case, the control section CS of the TLB corresponding entry is not influenced by the TLB succeeding entry set content.

In accordance with the TLB control described above, the control section CS of each entry of the TLB 35 stores updated data corresponding to the current page and the next page. For example, when a mishit (interrupt) occurs in a memory read operation by a given virtual address, the TLB corresponding entry is replaced. At this time, not only the bits V and M are uniquely set at correct values, but also the bits VNA, VNB, MNA, and MNB are updated to correctly reflect the state of the TLB succeeding entry set (by checking the TLB succeeding entry set). When the TLB corresponding entry is replaced, the bits VNA, VNB, MNA and MNB of the TLB previous entry set are updated to reflect the state of the TLB corresponding entry.

The above operation corresponds to the case of a fullword access involving a page boundary. When correct address translation data is not stored for either page, the TLB entry is updated in the following manner. In this case, as can be seen from the interrupt priority, processing, as in the case of a mishit, is performed. The TLB corresponding entry of the first page is replaced (including updating of the control section CS), and the control section CS (VNA, VNB, MNA, and MNB) of the TLB previous entry set is updated. When the fullword access is made at this point, processing for a next page mishit is performed. In this case, the TLB corresponding entry of the next page is replaced (including updating of the control section CS), and the control section (VNA, VNB, MNA, and MNB) of the TLB previous entry set, i.e., the TLB corresponding entry of the first page is updated. As a result, data indicating that correct address translation data is stored, both in this entry and the TLB succeeding entry set, is stored in the TLB corresponding entry which corresponds to the first page.

When a memory write access to the page in which the TLB corresponding entry is replaced is made by a mishit in the memory read generation, if an illegal main storage protection does not occur, a modify interrupt is requested, and the bit M of the TLB corresponding entry is set. At this time, the control section CS ($MN_i$) of the TLB previous entry set is updated to reflect the state of the TLB corresponding entry. The modify bit M of the corresponding entry of the page table 12 is also set. When it is desired to decrease the number of setting operations for the modify bit M of the page table 12 without using a modify interrupt of the corresponding entry of the page table 12, processing for modify (interrupt), mishit (interrupt) corresponding to next page modify (interrupt), and next page mishit is performed. However, in this case, since a replace of the TLB entry is performed, access to the segment table 11 and the page table 12 must be performed. Therefore, the efficiency in this case is lower than the system described above.

The embodiment is described with reference to a case wherein only one type of main storage protection data P.LEVEL is used. However, the present invention is not limited to this. For example, in order to efficiently perform main storage protection, three types of main storage protection data for protecting read, write and instruction execution can be prepared. In this case, illegal main storage protection is detected using main storage protection data corresponding to the type of each memory access.

What is claimed is:

1. A translation lookaside buffer (TLB) control system in a computer of virtual memory control scheme, comprising:

a translation lookaside buffer including, in each TLB entry, fields consisting of a bit V, representing validity of the entry, a bit $VN_i (i = 1, \ldots, n$; n is a integer of 1 or more) representing validity of a TLB entry corresponding to a page next to the page of the entry, and address translation data;

first detecting means, connected to said TLB, for detecting, for each memory access, if correct address translation data is stored in the TLB entry as well as if correct address translation data is detected in the TLB entry corresponding to the page next to the page of the TLB entry in accordance with an object virtual, address having an offset and predetermined fields of the bits V' and $VN_i$, and the address translation data of the TLB entry which corresponds to the object virtual address;

second detecting means responsive to the offset of said object virtual address for detecting if a single access involves a page boundary;

replacing means, connected to said TLB, said first detecting means, and said second detecting means, for performing a replace of the entry of the TLB in accordance with detection results of said first and second detecting means;

means, connected to said TLB, for setting the bit V' and resetting the bit $VN_i$ of a replace object TLB entry when said replacing means replaces the TLB entry; and updating means, connected to said TLB, for updating a bit $VN_i$ of a TLB entry corresponding to a page immediately preceding the replace object TLB entry.

2. A translation lookaside buffer (TLB) control system in a computer of virtual memory control scheme having a page table in which each page table entry has a field of a modify bit representing if a corresponding page is rewritten, and a field of a real page number, comprising:

- a translation lookaside buffer including, in each TLB entry, fields consisting of a bit V' representing validity of the TLB entry, a bit $VN_i$ (i=1, ..., n; n is an integer of 1 or more) representing validity of a TLB entry corresponding to a page next to the page of the TLB entry, a bit M' representing a state of a modify bit of the page table entry corresponding to the page indicated by the TLB entry, a bit $MN_i$ representing a state of a modify bit of the page table entry corresponding to the page next to the page indicated by the TLB entry, and address translation data;
- first detecting means, connected to said TLB, for detecting, for each memory access, the state of the modify bit of the page table entry corresponding to the page indicated by the TLB entry, and the state of the modify bit of the page table entry corrsponding to the page next to the page indicated by the TLB entry so as to determine if correct address translation data is stored in the TLB entry, in accordance with a object virtual, address having an offset and predetermined fields of the bits V' and $VN_i$, and the address translation data of the TLB entry which corresponds to the object virtual address;
- second detecting means responsive to the offset of said object virtual address for detecting if a single access involves a page boundary;
- replacing means, connected to said TLB, and said first and second detecting means, for performing a replace of the entry of the TLB in accordance with detection results of said first and second detecting means;
- means, connected to said TLB for setting the bit V' and resetting the bit $VN_i$ of a replace object TLB entry, and for resetting or setting the bit M' in accordance with a memory read/write operation when the TLB entry is replaced by said replacing means; and
- updating means, connected to said TLB for updating bits $VN_i$ and $MN_i$ of a TLB entry corresponding to a page immediately preceding the replace object TLB entry in accordance with the memory read/write operation.

3. A translation lookaside buffer (TLB) control system in a computer of virtual memory control scheme having a page table in which each page table entry has a field of a modify bit representing if a corrsponding page is rewritten, and a field of a real page number, comprising:

- a translation lookaside buffer including, in each TLB entry, fields consisting of a bit V, representing validity of the TLB entry, a bit $VN_i$ (i=1, ..., n; n is an integer of 1 or more) representing validity of a TLB entry corresponding to the page next to the page of the TLB entry, a bit M' representing a state of a modify bit of the page table entry corresponding to the page indicated by the entry, a bit $MN_i$ representing a state of a modify bit of the the page table entry corresponding to the page next to the page indicated by the TLB entry, and address translation data;
- first detecting means, connected to said TLB for detecting, for each memory access, the state of the modify bit of the page table entry corresponding to the page indicated by the TLB entry, and the state of the modify bit of the page table entry corresponding to the page next to the page indicated by the TLB entry so as to determine if correct address translation data is stored in the TLB entry and if correct address data is detected in the TLB entry corresponding to the page next to the page of the entry, in accordance with an object virtual address having an offset and predetermined fields of the bits V', $VN_i$, M', and $MN_i$ and the address translation data of the TLB entry which corresponds to the object virtual address;
- second detecting means responsive to the offset of said object virtual address for detecting if a single access involves a page boundary;
- replacing means, connected to said TLB, and said first and second detecting means, for performing a replace of the entry of the TLB in accordance with detection result of said first and second detecting means;
- means, connected to said TLB, for setting the bit V', and resetting the bit $VN_i$ of a replace object TLB entry, and for resetting or setting the bit M', in accordance with a memory read/write operation when the TLB entry is replaced by said replacing means;
- updating means, connected to said TLB, for updating bits $VN_i$ and $MN_i$ of a TLB entry corresponding to a page immediately preceding the replace object TLB entry in accordance with the memory read/write operation;
- means, connected to said TLB, for setting only the bit M' of the entry of the TLB in accordance with detection results of said first and second detecting means; and
- means, connected to said TLB, for updating the bit $MN_i$ of the TLB entry corresponding to the page immediately preceding the page indicate by the TLB entry for which the bit M' is set.

4. A translation lookaside buffer (TLB) control system in a computer of virtual memory control scheme, comprising:

- a translation lookaside buffer including, in each TLB entry, fields consisting of a bit V' representing validity of the entry, a bit $VN_i$ (i=1, ..., n; n is an integer of 1 or more) representing a validity of a TLB entry corresponding to a page next to the page of the entry, and address translation data;
- first detecting means, connected to said TLB, for detecting, for each memory access, if correct address translation data is stored in the TLB entry, and if correct address translation data is detected in a TLB entry corresponding to the page next to the page of the TLB entry in accordance with an object virtual address having an offset and predetermined fields of the bits V' and $VN_i$, and the address translation data of the TLB entry which corresponds to the object virtual address;
- second detecting means responsive to the offset of said object virtual address for detecting if a single access involves a page boundary;
- replacing means, connected to said TLB, and said first and second detecting means, for performing a replace of the entry of the TLB in accordance with detection results of said first and second detecting means;

means, connected to said TLB, for setting the bit V' of a replace object TLB entry when said replacing means replaces the TLB entry;

updating means, connected to said TLB, for updating a bit $VN_i$ of a TLB entry corresponding to a page immediately preceding the replace object TLB entry; and means, connected to said TLB, for checking the TLB entry corresponding to a page immediately succeeding the page indicated by the replace object TLB entry, and for setting a value of the bit $VN_i$ of the replace object TLB entry in accordance with a checking result.

5. A translation lookaside buffer (TLB) control system in a computer of virtual memory control scheme having a page table in which each page table entry has a field of a modify bit representing if a corresponding page is rewritten, and a field of a real page number, comprising:

a translation lookaside buffer including, in each TLB entry, fields consisting of a bit V' representing validity of the TLB entry, a bit $VN_i$ (i=1, ..., n; n is an integer of 1 or more) representing validity of a TLB entry corresponding to a page next to the page of the TLB entry, a bit M' representing a state of a modify bit of the page table entry corresponding to the page indicated by the TLB entry, a bit $MN_i$ representing a state of a modify bit of the page table entry corresponding to the page next to the page indicated by the TLB entry, and address translation data;

first detecting means, connected to said TLB, for detecting, for each memory access, the state of the modify bit of the page table entry corresponding to the page indicated by the TLB entry, and the state of the modify bit of the page table entry corresponding to the page next to the page indicated by the TLB entry so as to determine if correct address translation data is stored in the TLB entry, and if correct address translation data is stored in the TLB entry corresponding to the page next to the page indicated by the entry in accordance with an object virtual address, having an offset and predetermined fields of the bits V', and $VN_i$ and the address translation data of the TLB entry which corresponds to the object virtual address;

second detecting means responsive to the offset of said object virtual address for detecting if a single access involves a page boundary;

replacing means, connected to said TLB, and said first and second detecting means, for performing a replace of the entry of the TLB in accordance with detection results of said first and second detecting means;

means, connected to said TLB, for setting the bit V' of a replace object TLB entry and for resetting or setting the bit M' in accordance with a memory read/write operation when the TLB entry is replaced by said replacing means;

updating means, connected to said TLB, for updating bits $VN_i$ and $MN_i$ of a TLB entry corresponding to a page immediately preceding the replace object TLB entry in accordance with the memory read/write operation; and means, connected to said TLB, for checking the TLB entry corresponding to a page immediately succeeding the page indicated by the replace object TLB entry, and for setting values of the bits $VN_i$ and $MN_i$ of the replace object TLB entry in accordance with a checking result.

6. A translation lookaside buffer (TLB) control system in a computer of virtual memory control scheme having a page table in which each page table entry has a field of a modify bit representing if a corresponding page is rewritten, and a field of a real page number, comprising:

in a computer of virtual memory control scheme having a page table in which each page table entry has a field of a modify bit representing if a corresponding page is rewritten, and a field of a real page number, a translation lookaside buffer including, in each TLB entry, fields of a bit V, representing validity of the TLB entry, a bit $VN_i$ (i=1, ..., n; n is an integer of 1 or more) representing validity of a TLB entry corresponding to a page next to the page of the TLB entry, a bit M' representing a state of a modify bit of the page table entry corresponding to the page indicated by the TLB entry, a bit $MN_i$ representing a state of a modify bit of the page table entry corresponding to the page next to the page indicated by the TLB entry, and address translation data;

first detecting means, connected to said TLB, for detecting, for each memory access, the state of the modify bit of the page table entry corresponding to the page indicated by the TLB entry, and the state of the modify bit of the page table entry corresponding to the page next to the page indicated by the TLB entry so as to determine if correct address translation data is stored in the TLB entry, and if correct address translation data is stored in the TLB entry corresponding to the page next to the page indicated by the entry in accordance with a object virtual address having an offset and predetermined fields of the bits V', $VN_i$, M' and $MN_i$, and the address translation data of the TLB entry which corresponds to the object virtual address;

second detecting means responsive to the offset of said object virtual address for detecting if a single access involves a page boundary;

replacing means, connected to said TLB, and said first and second detecting means, for performing a replace of the entry of the TLB in accordance with detection results of said first and second detecting means;

means, connected to said TLB, for setting the bit V' of a replace object TLB entry and for resetting or setting the bit M' in accordance with a memory read/write operation when the TLB entry is replaced by said replacing means;

updating means, connected to said TLB, for updating bits $VN_i$ and $MN_i$ of a TLB entry corresponding to a page immediately preceding the replace object TLB entry in accordance with the memory read/write operation;

means, connected to said TLB, for checking the TLB entry corresponding to a page immediately succeeding the page indicated by the replace object TLB entry, and for setting values of the bits $VN_i$ and $MN_i$ of the replace object TLB entry in accordance with a check results;

means, connected to said TLB, for setting only the bit M' of the entry of the TLB in accordance with detection results of said first and second detecting means; and means, connected to said TLB, for updatig the bit $MN_i$ of the TLB entry corresponding to the page immediately preceding the page indicated by the TLB entry for which the bit M' is set by said M' bit setting means.

* * * * *